United States Patent
Wake et al.

[11] Patent Number: 5,940,536
[45] Date of Patent: Aug. 17, 1999

[54] RINGING DETECTOR AND FILTER

[75] Inventors: Kazuhiro Wake, Osaka; Masakazu Nishino, Kashiwara, both of Japan

[73] Assignee: Matsushita Electric Industrial Co., Ltd., Kadoma, Japan

[21] Appl. No.: 08/705,152

[22] Filed: Aug. 29, 1996

[30] Foreign Application Priority Data

Sep. 5, 1995 [JP] Japan .................................. 7-227693

[51] Int. Cl.$^6$ .................................................. G06K 9/36
[52] U.S. Cl. ........................................ 382/205; 382/260
[58] Field of Search .............................. 382/54, 276, 190, 382/195, 200, 203, 205, 206, 260–265; 364/724; 342/159; 341/143; 358/465

[56] References Cited

U.S. PATENT DOCUMENTS

| | | | |
|---|---|---|---|
| 4,760,541 | 7/1988 | Weygandt et al. | 364/724 |
| 4,982,294 | 1/1991 | Morton et al. | 358/465 |
| 5,003,618 | 3/1991 | Meno | 382/54 |
| 5,598,158 | 1/1997 | Linz | 341/143 |
| 5,608,824 | 3/1997 | Shimizu et al. | 382/276 |
| 5,617,099 | 4/1997 | Warren et al. | 342/159 |

FOREIGN PATENT DOCUMENTS

| | | |
|---|---|---|
| 1276880 | 11/1989 | Japan . |
| 556306 | 3/1993 | Japan . |

*Primary Examiner*—Andrew W. Johns
*Assistant Examiner*—Omar A. Omar
*Attorney, Agent, or Firm*—Renner, Otto, Boisselle & Sklar, P.L.L.

[57] ABSTRACT

The ringing detector of the invention receives data representing pixel values of a plurality of pixels including: a remarked pixel; a number L (where L is a natural number) of neighboring pixels which are located in the vicinity of the remarked pixel; and a number M (where M is a natural number) of surrounding pixels which are more distant from the remarked pixel than the neighboring pixels are, thereby generating a ringing constant t indicating whether or not a ringing exists in the vicinity of the remarked pixel. The ringing detector includes: a pixel value variation detector for calculating a value x corresponding to a variation in the pixel values of the neighboring pixels; a distance detector for calculating a value y corresponding to a distance between the pixel values of the surrounding pixels and a barycenter of the pixel values of the remarked pixel and the neighboring pixels; and a ringing constant calculator for calculating the ringing constant t based on the values x and y.

10 Claims, 9 Drawing Sheets

⊗ = Pixels into which
"0" has been inserted
(b=d=f=h=j=0)

RINGING DETECTOR AND FILTER

BACKGROUND OF THE INVENTION

1. Field of the Invention

The present invention relates to a ringing detector which receives a digital signal and determines whether or not ringing has been generated in the received digital signal, and a filter using the ringing detector.

2. Description of the Related Art

In order to reduce a required amount of data for recording or transmitting an image signal, it is effective to perform decimation processing in a horizontal direction or in a vertical direction of a screen with respect to the sample values of the image signal. In a conventional decimation processor, a filter is used for limiting the bandwidth to a Nyquist frequency or lower before the decimation processing is performed.

On the other hand, if a filter for limiting the bandwidth to a Nyquist frequency or lower is used for performing an interpolation, all the frequency components having a frequency equal to or lower than the Nyquist frequency are completely restored in contrast with the former case.

In this case, in order to transmit as much of the information of the original signal as possible, it is necessary to reduce the attenuation amount of the signal in the pass band by inclining the slope representing the cutoff characteristics of the filter as steeply as possible.

However, as the slope representing the cutoff characteristics of the filter is inclined more steeply by increasing the number of taps of the filter, a deterioration called "ringing" is generated more remarkably in the quality of the resulting image. To the contrary, as the slope representing the cutoff characteristics is inclined more gently by decreasing the number of taps of the filter, the attenuation amount of the signal in the pass band is increased, so that the information amount of the signal is decreased.

Therefore, according to a conventional technology, a filter has been designed so as to have moderately steep cutoff characteristics based on the attenuation amount of the input signal and the generation amount of the ringing. On the other hand, according to another conventional technology, the ringing of the signal passed through a low-pass filter is detected, whereby the cutoff characteristics of the filter are varied in accordance with the detected ringing.

For example, a method in which a signal processed by a low-pass filter is passed through a high-pass filter and the existence of the ringing is detected based on the output signal of the high-pass filter is disclosed in Japanese Laid-Open Patent Publication No. 1-276880. In accordance with this method, it is highly possible that the filter is erroneously operated by the high frequency components included in the input signal itself, or that the high frequency components of the input signal are erroneously detected as the ringing generated by the filtering processing. As a result, the high frequency components included in the input signal are sometimes lost.

On the other hand, a method for detecting the existence of the ringing based on a ratio of the maximum amplitude of the pixel value of a pixel existing in the vicinity of a remarked pixel (or a currently processed pixel) to the maximum amplitude of the pixel value of a pixel existing in the ringing detection region is disclosed in Japanese Laid-Open Patent Publication No. 5-56306.

In the above-described two kinds of methods, an edge portion (i.e., a boundary between a plurality of regions or a line dividing a plurality of regions) of an image is determined as having a ringing, so that the edge portion becomes blurred or thickens. Furthermore, in both of the two methods, the existence of the ringing is detected for a signal subjected to a decimation or an interpolation by using a high-pass filter and then processing for suppressing the ringing is performed. A signal which has passed through a high-pass filter for detecting a ringing reflects the characteristics of the filter, more specifically the impulse response thereof. Thus, in accordance with the above-described conventional methods, it is impossible to correctly determine whether the detected components are the high frequency components included in the input signal itself or the ringing generated by the filtering.

SUMMARY OF THE INVENTION

According to the present invention, a ringing detector is provided. The ringing detector of the invention receives data representing pixel values of a plurality of pixels including: a remarked pixel; a number L (where L is a natural number) of neighboring pixels which are located in the vicinity of the remarked pixel; and a number M (where M is a natural number) of surrounding pixels which are more distant from the remarked pixel than the neighboring pixels are, thereby generating a ringing constant t indicating whether or not a ringing exists in the vicinity of the remarked pixel. The ringing detector includes: a pixel value variation detector for calculating a value x corresponding to a variation in the pixel values of the neighboring pixels; a distance detector for calculating a value y corresponding to a distance between the pixel values of the surrounding pixels and a barycenter of the pixel values of the remarked pixel and the neighboring pixels; and a ringing constant calculator for calculating the ringing constant t based on the values x and y.

According to another aspect of the present invention, a filter is provided. The filter includes a ringing detector which receives data representing pixel values of a plurality of pixels including: a remarked pixel; a number L (where L is a natural number) of neighboring pixels which are located in the vicinity of the remarked pixel; and a number M (where M is a natural number) of surrounding pixels which are more distant from the remarked pixel than the neighboring pixels are, thereby generating a ringing constant t indicating whether or not a ringing exists in the vicinity of the remarked pixel and which includes: a pixel value variation detector for calculating a value x corresponding to a variation in the pixel values of the neighboring pixels; a distance detector for calculating a value y corresponding to a distance between the pixel values of the surrounding pixels and a barycenter of the pixel values of the remarked pixel and the neighboring pixels; and a ringing constant calculator for calculating the ringing constant t based on the values x and y, and the filter further includes a filtering processing section for subjecting input data to filtering processing having different characteristics in accordance with the ringing constant t.

In one embodiment, the filtering processing section includes a plurality of filters and a filter selector for selecting one from the plurality of filters.

In another embodiment, the filtering processing section includes a single filter and filtering characteristics of the single filter are varied in accordance with the ringing constant t.

In still another embodiment, the filtering processing section includes a plurality of filters and a weighting operation section for performing a weighting operation with respect to outputs of the plurality of filters and outputting the weighted outputs.

In still another embodiment, the ringing detector further includes a zero insertion section.

In still another embodiment, the filter further includes a zero insertion section.

Thus, the invention described herein makes possible the advantage of providing a ringing detector, a decimation filter and an interpolation filter which can be used for suppressing the generation of a ringing without causing any loss in the high frequency components (or, in the case where the input signal represents an image, the components corresponding to the details of the image) of the input signal.

This and other advantages of the present invention will become apparent to those skilled in the art upon reading and understanding the following detailed description with reference to the accompanying figures.

DESCRIPTION OF THE PREFERRED EMBODIMENTS

Figure 1:
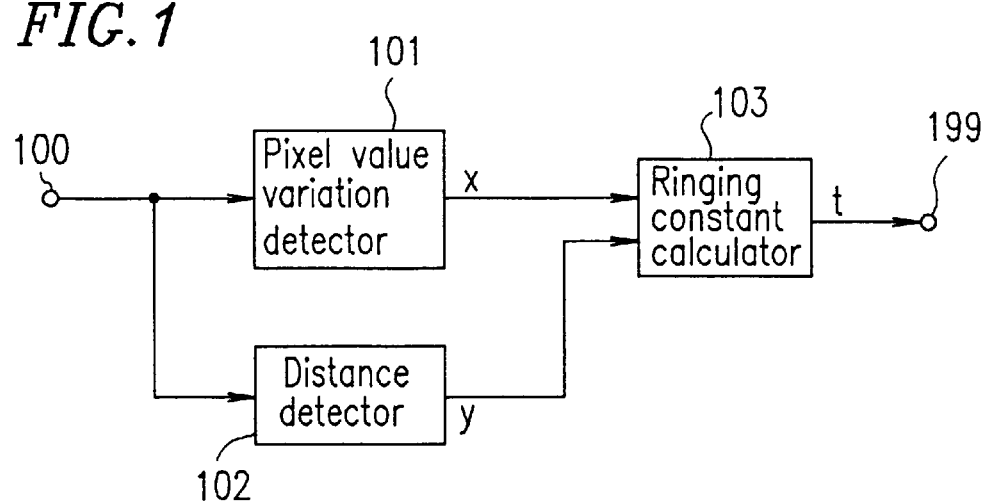
FIG. 1 is a block diagram showing a configuration for a ringing detector in a first example of the present invention.

Hereinafter, the ringing detector, the decimation filter and the interpolation filter according to the present invention will be described with reference to the accompanying drawings, in which the same reference numerals denote the same components throughout the following examples.

EXAMPLE 1

FIG. 1 is a block diagram showing a configuration for the ringing detector in a first example of the present invention. The ringing detector of the present invention outputs a ringing constant t which can be represented as a value ranging from "0" to "1" and used for determining, based on the input image data, whether or not a relatively small variation in the pixel value included in the image is a ringing. In this specification, the larger the ringing constant t becomes, the smaller the amount of ringing is determined to be. When the ringing constant t is equal to "0", the generation of the ringing is indicated. On the other hand, when the ringing constant t is equal to "1", the non-generation of the ringing is indicated. Furthermore, when the ringing constant t is an intermediate value between "0" and "1", the smaller the constant t is, the higher the possibility of the generation of the ringing is determined to be.

An input terminal 100 receives data representing an image. The data input to the input terminal 100 is digital data representing the pixel values of the pixels located at respective positions on the screen. Herein, in the case where a monochrome display is performed, for example, the pixel values are numeric values representing the luminances of the pixels and can be represented as integral values from "0" to "255". On the other hand, in the case where a color display is performed, it is only necessary to separately receive the data corresponding to the three primary colors of red (R), green (G) and blue (B) of the respective pixels; separately process the respective data; and then separately output the separately processed data corresponding to the respective components.

A pixel value variation detector 101 calculates the magnitude of the variation in the pixel value of a pixel in the vicinity of the remarked pixel or the pixel currently processed. In this specification, such a variation will be simply referred to as a "pixel value variation x in the vicinity". A distance detector 102 calculates a difference between the pixel value of a pixel distant from the remarked pixel by a predetermined number of pixels and the barycenter of a plurality of pixels located in the vicinity of the remarked pixel. In this specification, such a distance will be simply referred to as a "distance y from the barycenter". A ringing constant calculator 103 calculates the ringing constant t based on the pixel value variation x and the distance y from the barycenter and then outputs the constant through an output terminal 199.

Hereinafter, the operation of the ringing detector in the first example will be described in more detail. In the first example, it is assumed that the image data passed through a low-pass filter is input through the input terminal 100. Herein, the tap number N of this low-pass filter is assumed to be 11 and the tap coefficients are assumed to be (t0, 0, t1, 0, t2, t3, t4, 0, t5, 0, t6).

Figure 2:
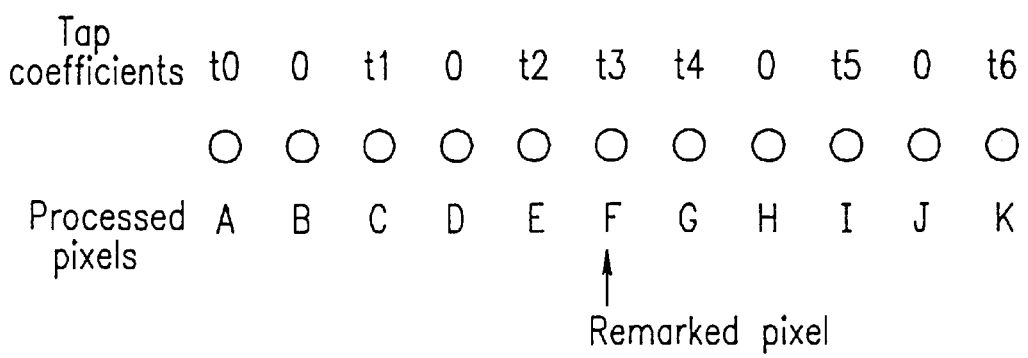
FIG. 2 is a conceptual diagram showing a relationship between processed pixels including a remarked pixel and tap coefficients.

FIG. 2 is a conceptual diagram illustrating a relationship between processed pixels including a remarked pixel and tap coefficients. In FIG. 2, the pixel values of the pixels A, B, C, D, E, F, G, H, I, J and K are assumed to be a, b, c, d, e, f, g, h, i, j and k, respectively. According to the present invention, the ringing constant t is calculated with respect to a "remarked pixel" by using the remarked pixel and a plurality of pixels located in the vicinity of the remarked pixel. The processed pixels A, B, C, D, E, F, G, H, I, J and K are sequentially located in this order on a horizontal line on the screen, for example. Though the remarked pixel in FIG. 2 is the processed pixel F, the remarked pixel is shifted rightward one by one every time the ringing constant is calculated, i.e., from F to G . . . and then to K. There are some tap coefficients represented as "0" among the tap coefficients. Thus, assuming that the remarked pixel is F, the pixels actually used in the above-described filtering operation are A, C, E, F, G, I and K.

Figure 3:
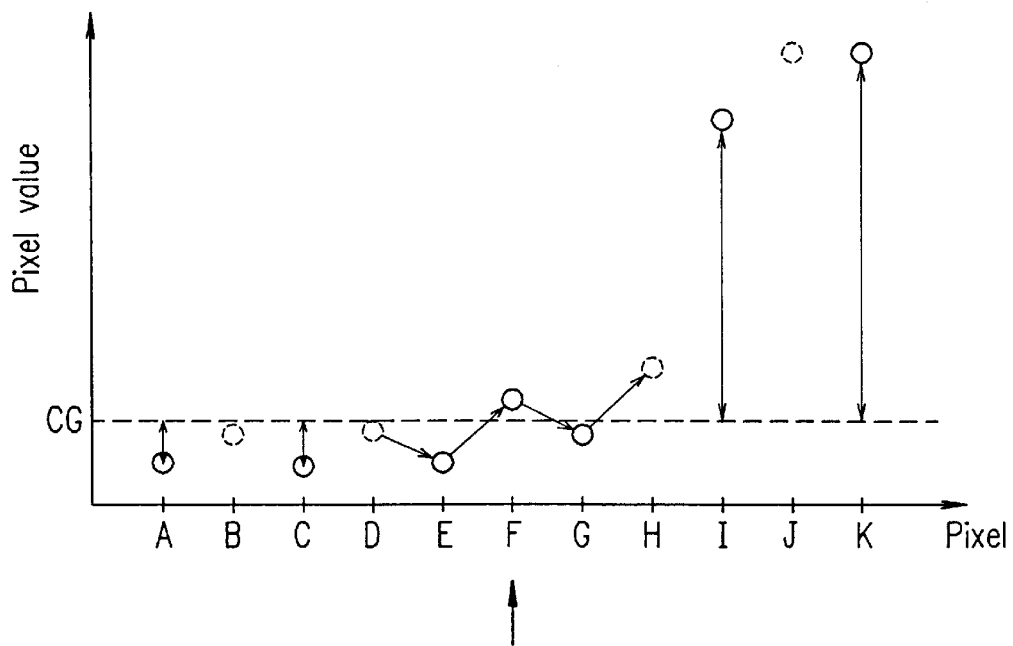
FIG. 3 is a graph illustrating the conditions of the generation of the ringing.

FIG. 3 is a graph illustrating the conditions of the generation of the ringing. In FIG. 3, the axis of abscissas indicates the locations of the pixels, while the axis of ordinates indicates the pixel values of the respective pixels. The complete circles represent the pixel values corresponding to the tap coefficients which are not "0", while the broken circles represent the pixel values corresponding to the tap coefficients which are "0".

In this specification, the ringing resulting from the decimation filter is assumed to be generated when both the following two Conditions 1 and 2 are satisfied.

Condition 1: the pixel values d, e, f, g and h are located within a narrow range.

Condition 2: the pixel values a and k are largely different from the barycenter calculated from the pixel values e, f and g.

The pixel value variation detector 101 calculates the pixel value variation x in the vicinity, used for determining whether or not Condition 1 is satisfied, based on the following Equation 1 and then outputs the pixel value variation x.

$$x = max(d-e, e-f, f-g, g-h) - min(d-e, e-f, f-g, g-h) \quad (1)$$

The function "max" provides the maximum value of the arguments thereof, while the function "min" provides the minimum value of the arguments thereof. Therefore, the pixel value variation x becomes smaller as the variation between adjacent two pixel values among the pixel values d, e, f, g and h (i.e., the inclination of an arrow between adjacent pixel values shown in FIG. 3) becomes smaller.

The distance detector 102 calculates the distance y from the barycenter, used for determining whether or not Condition 2 is satisfied, based on the following Equation 2, and then outputs the distance y.

$$y = abs(p0 \times t0/t1 + p1) \quad (2)$$

where p0=(q-a)+(q-k), p1=(q-c)+(q-i) and q=(e+2×f+g)/4. Herein, the value q represents the barycenter of the pixel values e, f and g. The value p0 is a sum of the distance from the barycenter q to the pixel value a and the distance from the barycenter q to the pixel value k. The value p1 is a sum of the distance from the barycenter q to the pixel value c and the distance from the barycenter q to the pixel value i. The values t0 and t1 are tap coefficients t0 and t1 of the filter, respectively. Thus, the distance y from the barycenter become larger as the pixel values a, c, i and k are more distant from the barycenter of the pixel values e, f and g, respectively.

Figure 4:
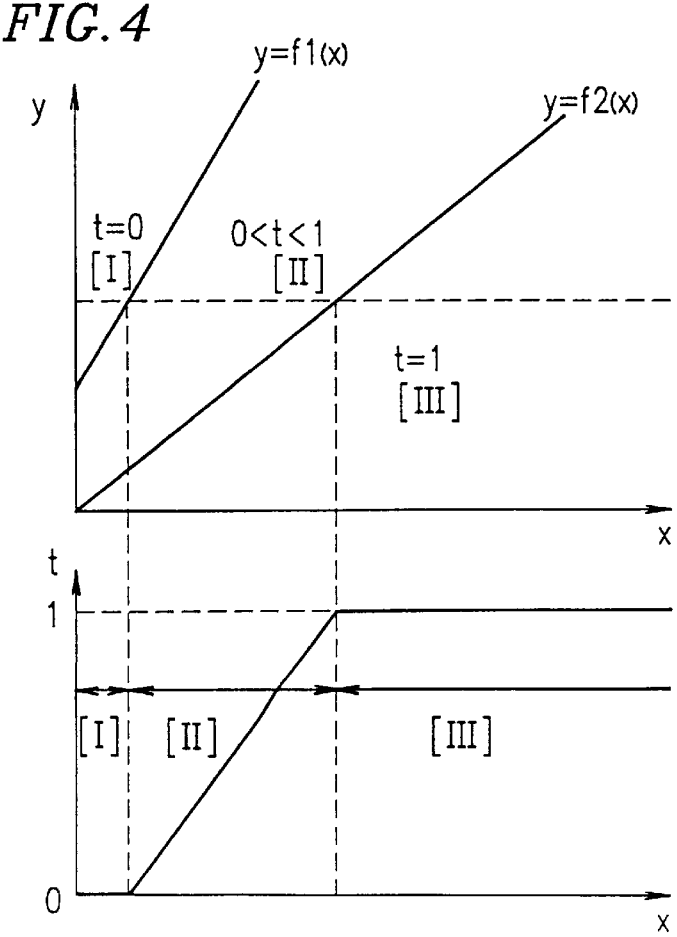
FIG. 4 is a graph showing a relationship between the variation x and the distance y and a relationship between the variation x and the constant t.

The ringing constant calculator 103 calculates the ringing constant t based on the variation x and the distance y obtained by the Equations 1 and 2, respectively. FIG. 4 is a graph showing a relationship between the variation x and the distance y and a relationship between the variation x and the constant t.

In the region I shown in FIG. 4, t=. In other words, when the point determined by the variation x and the distance y is located in the region I, the ringing constant calculator 103 outputs t=. When the variation x is small and the distance y is large, t=. In such a case, it can be determined that a ringing has been generated in the vicinity of the remarked pixel.

In the region III shown in FIG. 4, t=1. In other words, when the point determined by the variation x and the distance y is located in the region III, the ringing constant calculator 103 outputs t=1. When the variation x is large and the distance y is small, t=1. In such a case, it can be determined that a ringing has not been generated in the vicinity of the remarked pixel.

In the region II shown in FIG. 4, 0<t<1. In other words, when the point determined by the variation x and the distance y is located in the region II, the ringing constant calculator 103 outputs t satisfying the inequality 0<t<1. If both the variation x and the distance y are represented as intermediate values, then 0<t<1. In such a case, it is estimated that a ringing has possibly been generated in the vicinity of the remarked pixel.

The boundary between the regions I and II shown in FIG. 4 can be represented by y=f1 (x), while the boundary between the regions II and III shown in FIG. 4 can be represented by y=f2 (x). Herein, the functions f1 and f2 are linear functions.

Figure 5:
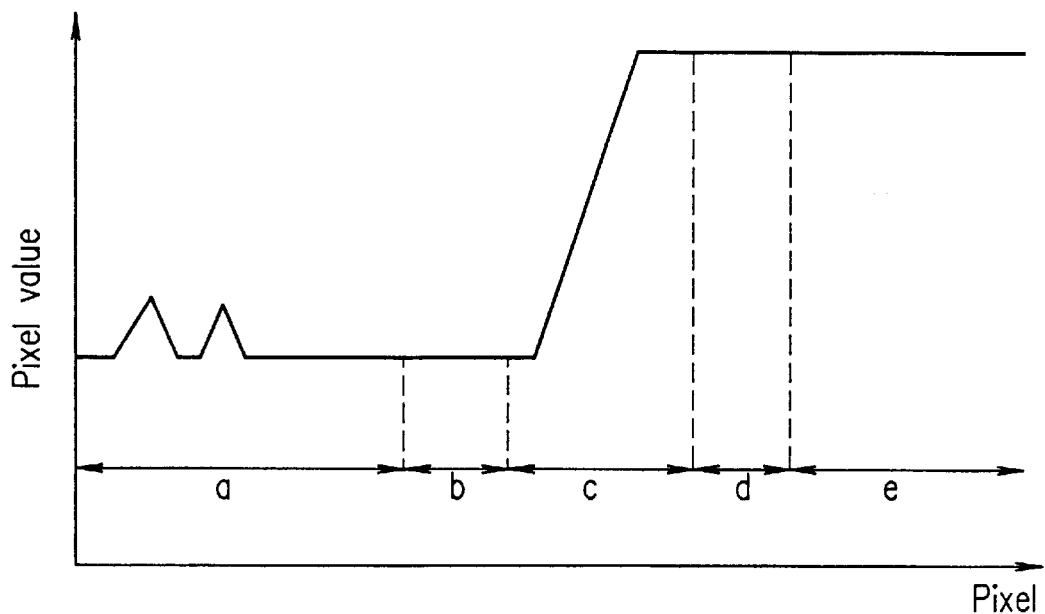
FIG. 5 is a graph showing the pixel values represented by the data which has not been subjected to the filtering processing yet.
Figure 6:
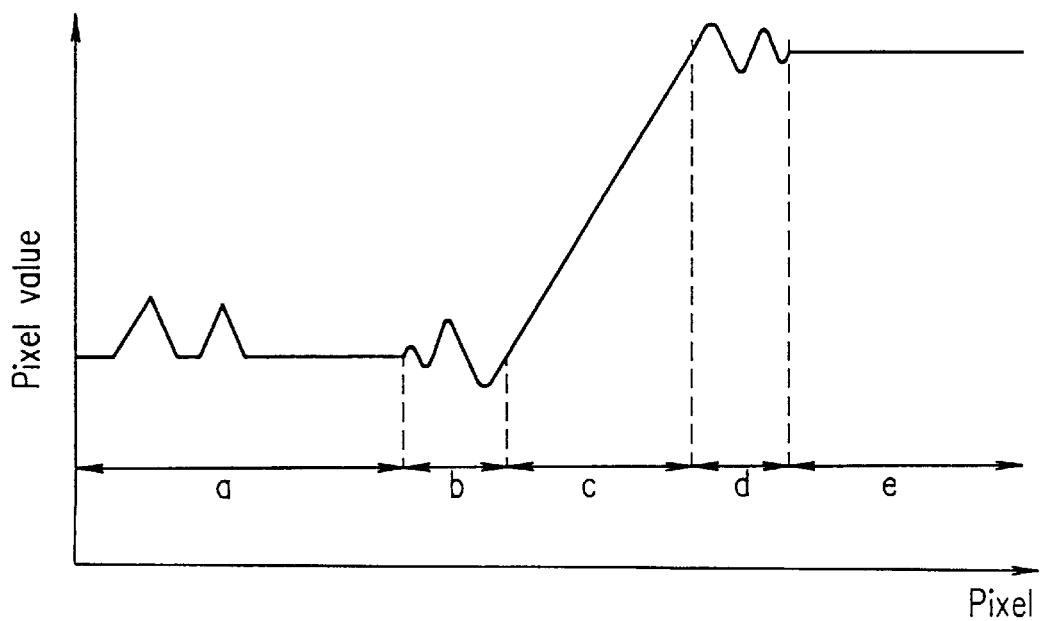
FIG. 6 is a graph showing the pixel values represented by the data which has been subjected to the filtering processing.

The advantages of the ringing detector according to the present invention over a conventional ringing detector (e.g., the detector described in Japanese Laid-Open Patent Publication No. 5-56306) will be described below. In the following description, the tap number of the low-pass filter to be used for the filtering processing is assumed to be 11 (N=11). FIG. 5 is a graph showing the pixel values represented by the data which has not yet been subjected to the filtering processing, more specifically the processing performed by the low-pass filter. FIG. 6 is a graph showing the pixel values represented by the data which has been subjected to the filtering processing. In FIGS. 5 and 6, the saw-toothed portion existing in the region a represents the high frequency components of the original signal which also existed before the filtering processing. In the region c shown in FIG. 5, a steep edge exists.

When the data shown in FIG. 5 is subjected to the filtering, the data shown in FIG. 6 can be obtained. The edge existing in FIG. 5 comes to have a gentler inclination by the filtering using the low-pass filter. In the regions b and d shown in FIG. 6, the ringing has been generated by the edge existing in the region c shown in FIG. 5.

If one tries to detect the ringing from the data which has been subjected to the filtering processing as shown in FIG. 6 in accordance with the conventional technologies, the regions a and e are determined as "having no ringing", while the regions b, c and d are determined as "having a ringing". On the other hand, according to the present invention, the regions a, c and e are determined as "having no ringing", while the regions b and d are determined as "having a ringing". That is to say, the ringing detector according to the present invention can obtain a correct detection result that the region c "has no ringing". As a result, if the ringing detector according to the present invention is used, a filter having steep cutoff characteristics can be used for the region c, because the region c has no ringing and it is possible to prevent the edge of the region c from being blurred.

As described above, by using the ringing detector according to the present invention, it is possible to suppress only the ringing without damaging the definition of the original signal.

EXAMPLE 2

Figure 7:
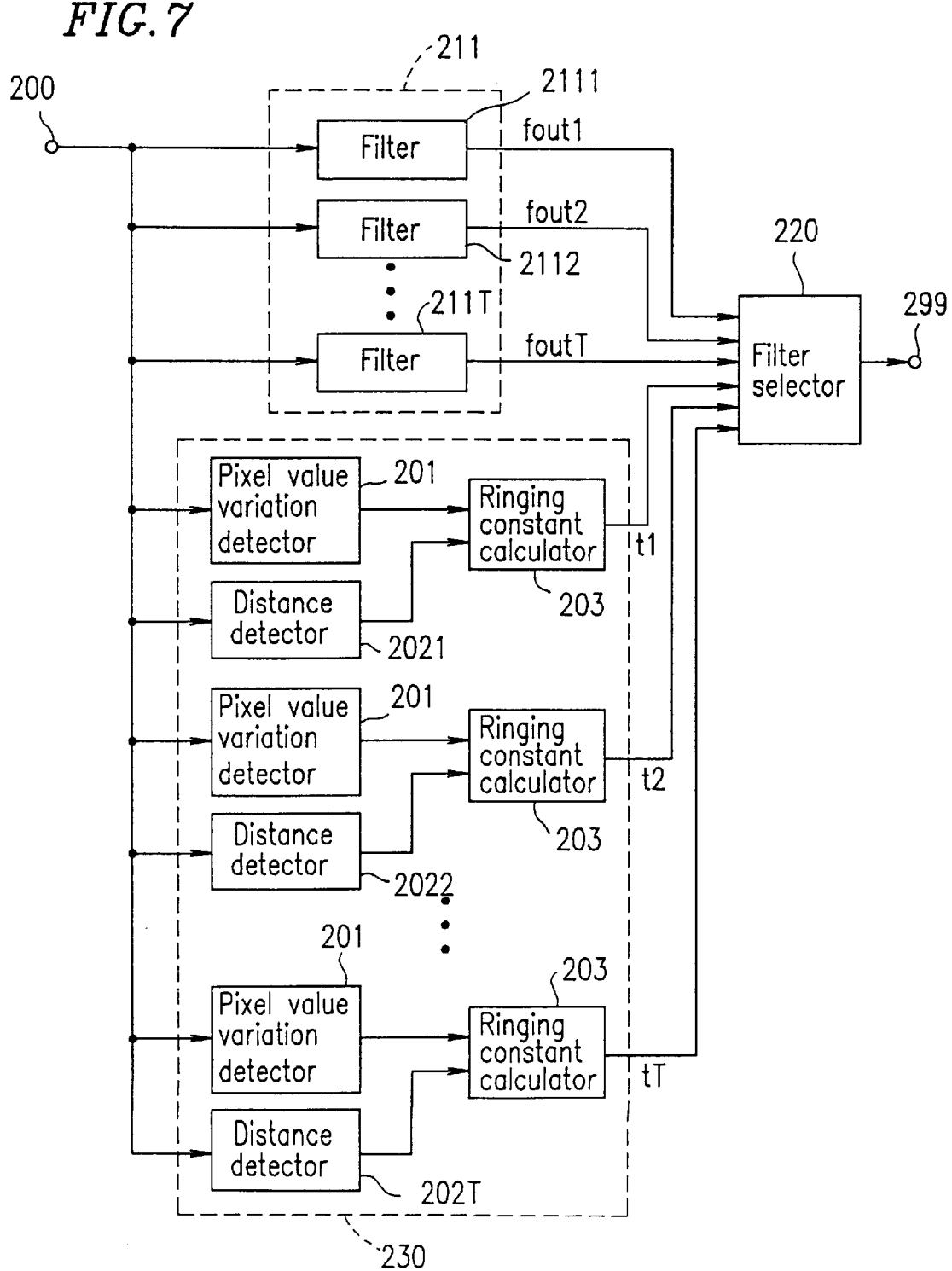
FIG. 7 is a block diagram showing a configuration for a decimation filter in a second example of the present invention.

FIG. 7 is a block diagram showing a configuration for a decimation filter in a second example of the present invention. An input terminal 200 receives data representing an image. A filter section 211 includes a number T of low-pass filters 2111, 2112, ... 211T (where T is an integer larger than 1). The filters 2111, 2112, ... 211T perform filtering processing with respect to the data received through the input terminal 200, thereby outputting the filtered data as filtered outputs fout1, fout2, ... foutT to a filter selector 220. The low-pass filtering characteristics of the filters 2111, 2112, ... 211T become gentler in the ascending order. In other words, the filter 2111 has the steepest low-pass filtering characteristics and the filter 211T has the gentlest low-pass filtering characteristics.

A ringing detector 230 includes: a pixel value variation detector 201; ringing constant calculators 203; and a number T of distance detectors 2021, 2022, ... 202T (where T is an integer larger than 1). The distance detectors 2021, 2022, ... 202T correspond to the filters 2111, 2112, ... 211T, respectively. The filtered outputs fout1, fout2, ... foutT correspond to the ringing constants t1, t2, ... tT, respectively. The Equation 1 used by the distance detectors 2021, 2022, ... 202T for calculating the distance y becomes different depending upon the filtering characteristics of the filters 2111, 2112, ... 211T. Thus, even if the same input data is applied to the input terminal 200, the ringing constants t1, t2, ... tT output by the number T of ringing constant calculators 203 are different from each other.

In response to the ringing constants t1, t2, tT output from the ringing constant calculators 203, the filter selector 220 selects only one output from the filtered outputs fout1, fout2, ... foutT output from the filters 2111, 2112, ... 211T, respectively, and then outputs the selected filtered output to an output terminal 299. The filter selector 220 selects and outputs a filtered output corresponding to the maximum ringing constant among the ringing constants which are smaller than a predetermined threshold value tTH.

For example, the ringing constants and the threshold value tTH are assumed as follows: t1=0.0, t2=0.3, t3=0.49, t4=0.55, ... tT=1.0 and tTH=0.5. Since the maximum ringing constant smaller than the threshold value tTH (=0.5) is t3=0.49, the filtered output fout3 output from the filter 2113 (not shown) is selected by the filter selector 220 and then output.

For example, the filter selector 220 is assumed to select one filter from the filters 2111 to 2114 in accordance with the predetermined threshold value tTH. In this case, the tap coefficients and the ringing constants of the respective filters are assumed as follows.

The coefficients of the filter 2111: $-1, 0, 6, 0, -11, 0, 38, 64, 38, 0, -11, 0, 6, 0$ and $-1$ The ringing constant of the filter 2111: 0.35

The coefficients of the filter 2112: $1, 0, -5, 0, 20, 32, 20, 0, -5, 0$ and $1$ The ringing constant of the filter 2112: 0.45

The coefficients of the filter 2113: $-1, 0, 9, 16, 9, 0$ and $-1$

The ringing constant of the filter 2113: 0.7

The coefficients of the filter 2114: $1, 2$ and $1$

The ringing constant of the filter 2114: 1.0

In this case, the predetermined threshold value tTH is assumed to be 0.5. The filter selector 220 selects the filter 2112 (the ringing constant of this filter is 0.45), i.e., a filter corresponding to the maximum ringing constant among the ringing constants which are smaller than the predetermined threshold value tTH (=0.5).

In the decimation filter in the second example, the characteristics of the filter to be used can be varied in accordance with the ringing constant. More specifically, a filter having gentler filtering characteristics can be used in a region where a ringing is more likely to be generated, while a filter having steeper filtering characteristics can be used in a region where a ringing is less likely to be generated. As a result, it is possible to suppress only the ringing without damaging the definition of a signal.

EXAMPLE 3

Figure 8:
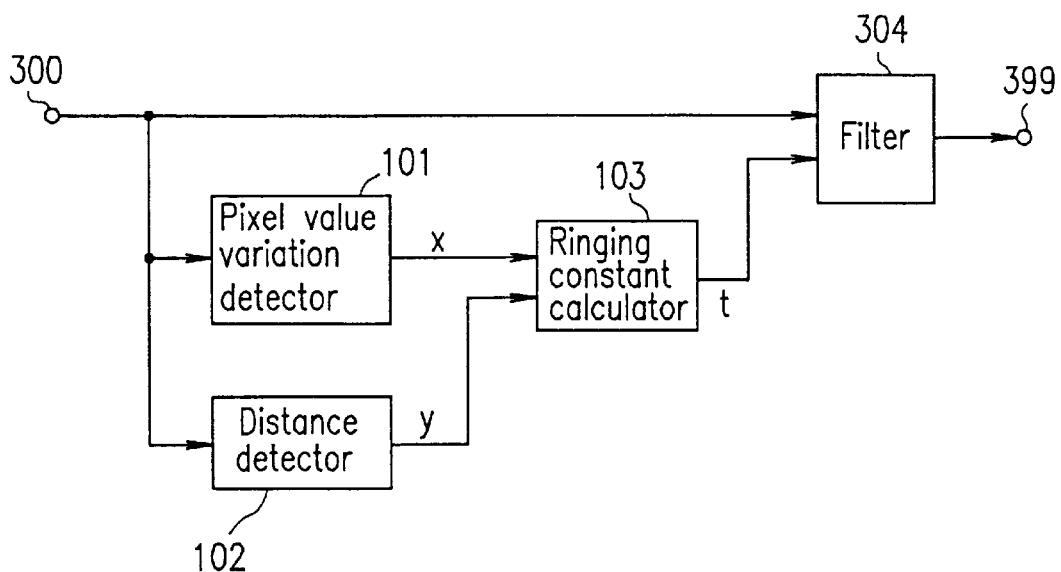
FIG. 8 is a block diagram showing a configuration for a decimation filter in a third example of the present invention.

FIG. 8 is a block diagram showing a configuration for a decimation filter in a third example of the present invention. A filter 304 receives not only a ringing constant t but also input data representing an image which has been received through an input terminal 300. The filter 304 selected one set from plural sets of tap coefficients in accordance with the received ringing constant t; performs filtering processing on the input data by using a filter formed by the set of tap coefficients; and then outputs the filtered data to an output terminal 399. Since a ringing is generated when the ringing constant t=0, the filter 304 selects a set of tap coefficients realizing gentler filtering characteristics. To the contrary, since a ringing is not generated when the ringing constant t=1, the filter 304 selects a set of tap coefficients realizing steeper filtering characteristics.

The filter 304 holds the plural sets of tap coefficients in the form of a table.

The pixel value variation detector 101, the distance detector 102 and the ringing constant calculator 103 function in the same way as those described in the first example.

In the decimation filter in the third example, the characteristics of the filter are made gentler in a region where a ringing is more likely to be generated, while the characteristics of the filter are made steeper in a region where a ringing is less likely to be generated. As a result, it is possible to suppress only the ringing without damaging the definition of a signal.

EXAMPLE 4

Figure 9:
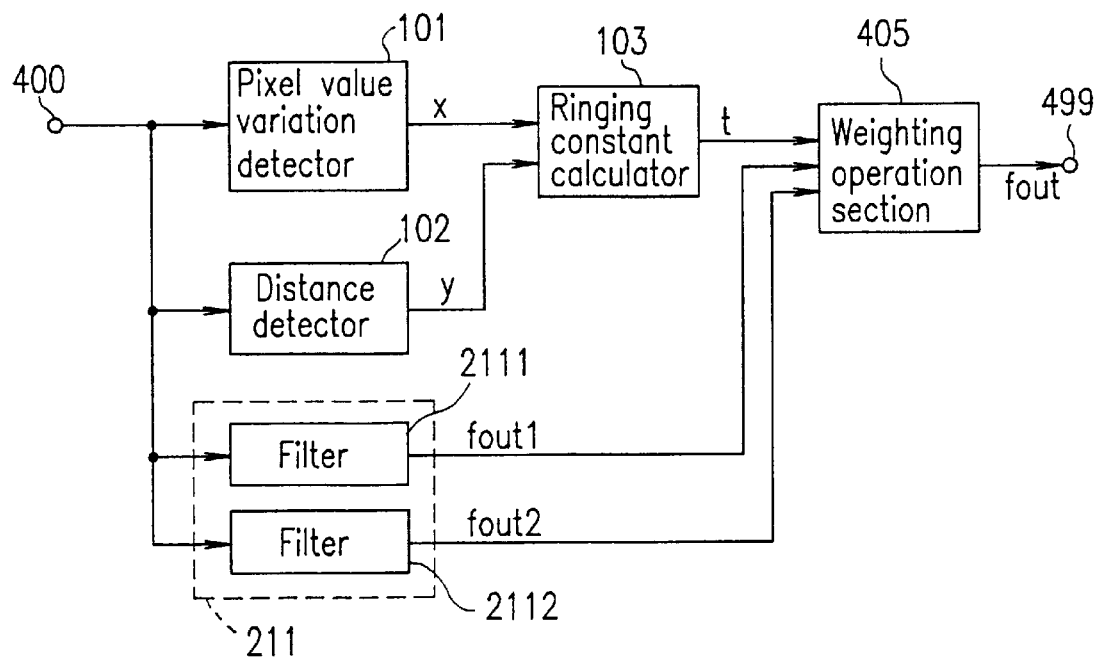
FIG. 9 is a block diagram showing a configuration for a decimation filter in a fourth example of the present invention.

FIG. 9 is a block diagram showing a configuration for a decimation filter in a fourth example of the present invention. An input terminal 400 receives input data representing an image. In FIG. 9, a filter section 211 including filters 2111 and 2112 is shown. However, the number of filters to be provided is not limited to two. A weighting operation section 405 applies a weight to the filtered outputs fout1 and fout2 in accordance with the ringing constant t; adds the two weighted outputs; and then outputs the sum to an output terminal 499.

The weighting operation performed by the weighting operation section 405 will be described below. Two filters having respectively different cutoff frequency characteristics are assumed to be the filters 2111 and 2112. The tap numbers and the tap coefficients of the two filters are set so that the filter 2111 functions as a filter having steeper characteristics and that the filter 2112 functions as a filter having characteristics smooth enough to prevent a ringing from being generated. Since the filter 2112 has characteristics smooth enough to prevent a ringing from being generated, an operation for detecting a ringing from the input data has only to be performed on the filter 2111. Assuming that the output of the weighting operation section 405 is denoted by fout, the output fout can be represented by the following equation:

$$fout = t \times fout1 + (1-t) \times fout2$$

That is to say,
   region I (t=0): fout=fout2
   region II (0<t<1): fout=t×fout1+(1−t)×fout2
   region III (t=1): fout=fout1

Since the ringing constants t can be represented as continuous values in the range of 0<t<1, the continuity can be secured in the boundary regions among the regions I, II and III.

In the decimation filter in the fourth example, a filter having gentler filtering characteristics is used in a region where a ringing is more likely to be generated, while a filter having steeper filtering characteristics is used in a region where a ringing is less likely to be generated. As a result, it is possible to suppress only the ringing without damaging the definition of a signal. In addition, by continuously switching the two filters, it is possible to suppress a visual deterioration of an image in the boundary region.

EXAMPLE 5

Figure 10:
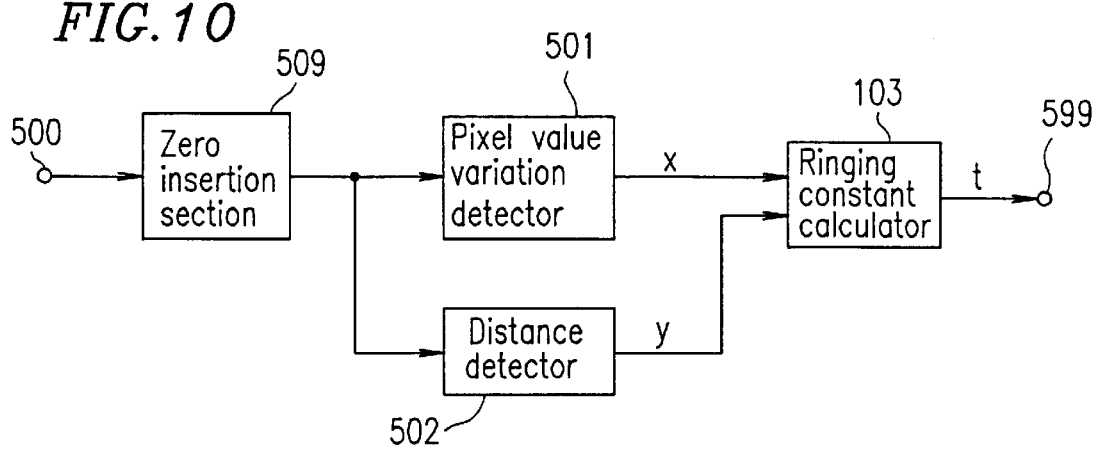
FIG. 10 is a block diagram showing a configuration for a ringing detector in a fifth example of the present invention.

FIG. 10 is a block diagram showing a configuration for a ringing detector in a fifth example of the present invention. The ringing detector of the fifth example has the same configuration as that of the ringing detector of the first example shown in FIG. 1 except that the image data received through an input terminal 500 is applied to a zero insertion section 509. The zero insertion section 509 inserts data having a pixel value of "0" between adjacent two data representing original pixels for interpolating the input data representing an image. An output terminal is denoted by 599.

Hereinafter, the operation of the ringing detector in the fifth example will be described. In the fifth example, the tap number N is assumed to be 11 and the tap coefficients are assumed to be (t0, 0, t1, 0, t2, t3, t4, 0, t5, 0, t6) in the same way as in the first example. In this example, the tap coefficients t0 to t6 are 1, −5, 20, 32, 20, −5 and 1.

Figure 11:
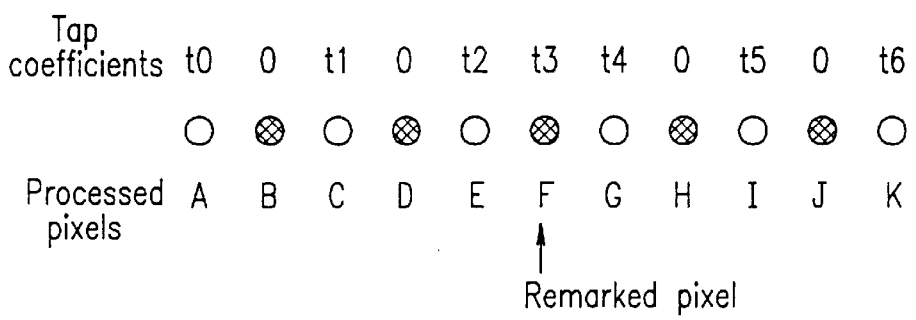
FIG. 11 is a conceptual diagram illustrating an interpolation operation in the fifth example.

FIG. 11 is a conceptual diagram illustrating an interpolation operation in the fifth example. In FIG. 11, the pixel values of the pixels A, B, C, D, E, F, G, H, I, J and K are assumed to be a, b, c, d, e, f, g, h, i, j and k, respectively. The pixels B, D, F, H and J are pixels into which a pixel value of "0" has been inserted and b=d=f=h=j=. In this case, the pixels actually used for the filtering operation are A, C, E, F, G, I and K and F is a remarked pixel.

Figure 12:
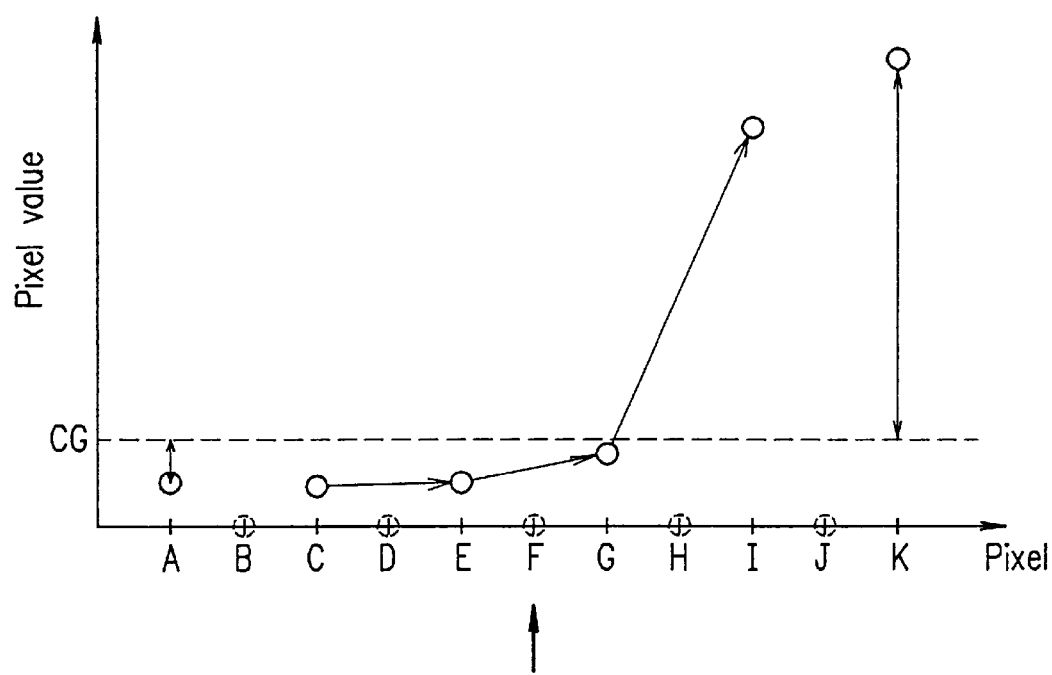
FIG. 12 is a graph illustrating the conditions of the generation of the ringing.

FIG. 12 is a graph illustrating the conditions of the generation of the ringing. In FIG. 12, the axis of abscissas indicates the locations of the pixels, while the axis of ordinates indicates the pixel values of the respective pixels. The complete circles represent the original pixels, while the broken circles represent a pixel value of "0" which has been inserted by the zero insertion section 509.

In this specification, the ringing resulting from the interpolation filter is assumed to be generated when both the following two conditions 3 and 4 are satisfied.

Condition 3: the pixel values c, e, g and i are located within a narrow range.

Condition 4: the pixel values a and k are largely different from the barycenter calculated from the pixel values c, e, g and i.

The pixel value variation detector 501 calculates the pixel value variations x in the vicinity, used for determining whether or not the Condition 3 is satisfied, based on the following Equation 3 and then outputs the pixel value variation x.

$$x = max(c-e, e-g, g-i) - min(c-e, e-g, g-i) \quad (3)$$

The function "max" provides the maximum value of the arguments thereof, while the function "min" provides the minimum value of the arguments thereof. Therefore, the pixel value variation x becomes smaller as the variation between adjacent two pixel values among the pixel values c, e, g and i (i.e., the inclination of an arrow between adjacent pixel values shown in FIG. 12) becomes smaller.

The distance detector 502 calculates the distance y from the barycenter, used for determining whether or not Condition 4 is satisfied, based on the following Equation 4 and then outputs the distance y.

$$y = abs(p0) \quad (4)$$

where p0=(q−a)+(q−k) and q=(c+e+g+i)/4. Herein, the value q represents the barycenter of the pixel values c, e, g and i. The value p0 is a sum of the distance from the barycenter q to the pixel value a and the distance from the barycenter q to the pixel value k.

The ringing constant calculator 103 calculates and outputs the ringing constant t based on the pixel value variation x and the distance y obtained by the Equations 3 and 4, respectively, in the same way as in the first example.

In the fifth example, a ringing constant t indicating the absence of the ringing can be obtained in the edge portion, in the same way as in first example. As a result, it is possible to suppress only the ringing without damaging the definition of a signal.

EXAMPLE 6

Figure 13:
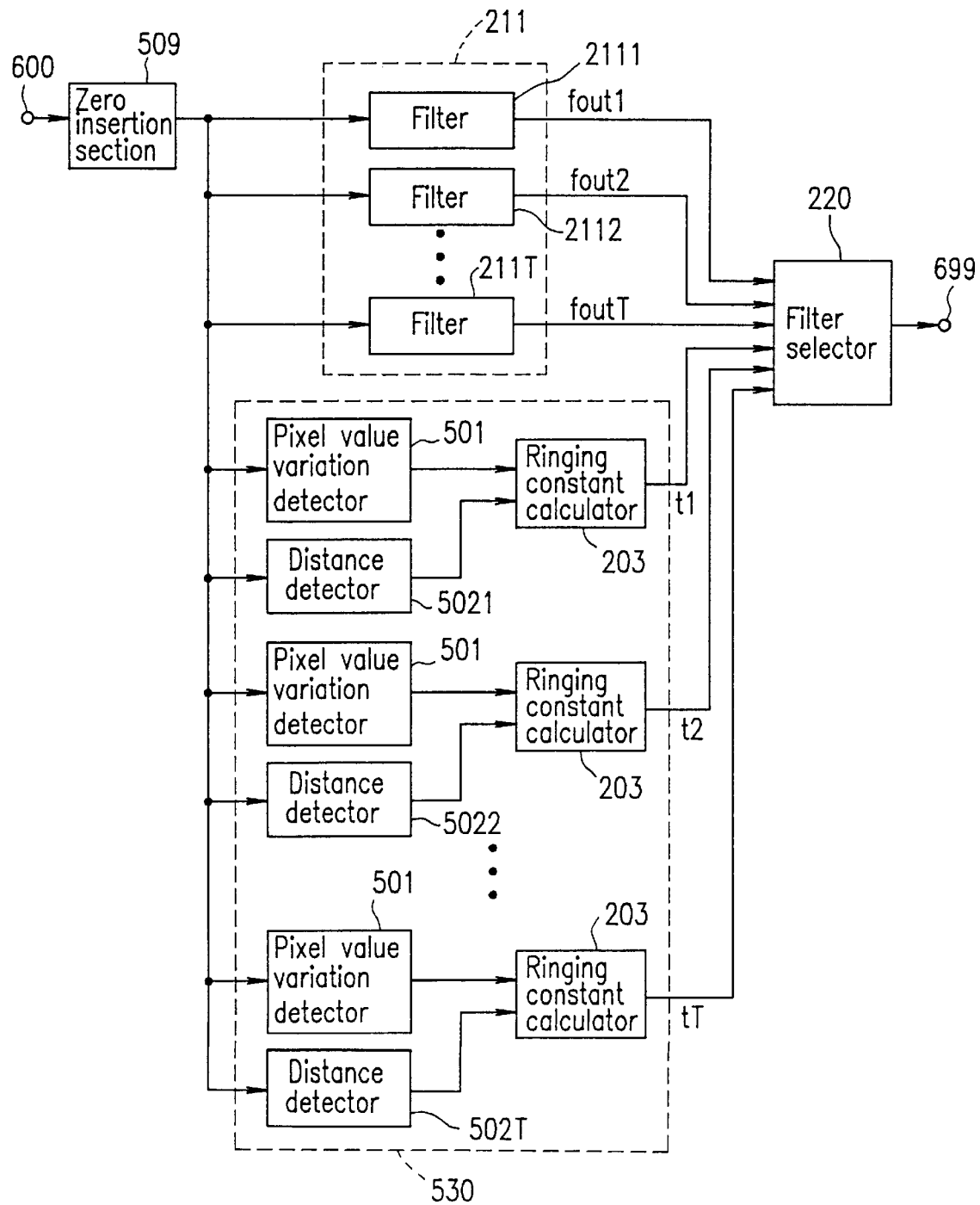
FIG. 13 is a block diagram showing a configuration for an interpolation filter in a sixth example of the present invention.

FIG. 13 is a block diagram showing a configuration for an interpolation filter in a sixth example of the present invention. The interpolation filter of the sixth example has the same configuration as that of the decimation filter of the second example shown in FIG. 7 except that the image data received through an input terminal 600 is applied to a zero insertion section 509. An output terminal is denoted by 699.

In FIG. 13, the distance detectors 5021, 5022, . . . 502T have the same function as that of the distance detector 502 described with reference to FIG. 12. It is noted that the Equation 3 used by the distance detectors 5021, 5022, . . . 502T for calculating the distance y becomes different depending upon the filtering characteristics of the filters 2111, 2112, . . . 211T in the same way as in the second example described with reference to FIG. 7.

In the sixth example, the same effects as those of the second example can be attained for an interpolation filter, instead of a decimation filter. Thus, by using a filter having gentler filtering characteristics in a region where a ringing is more likely to be generated and a filter having steeper filtering characteristics in a region where a ringing is less likely to be generated, it is possible to suppress only the ringing without damaging the definition of a signal.

EXAMPLE 7

Figure 14:
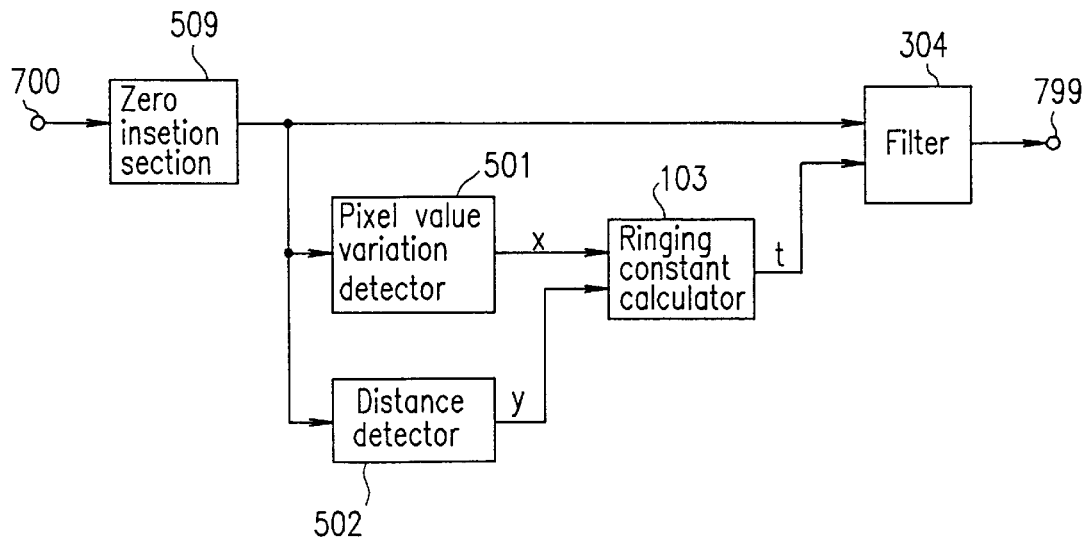
FIG. 14 is a block diagram showing a configuration for an interpolation filter in a seventh example of the present invention.

FIG. 14 is a block diagram showing a configuration for an interpolation filter in a seventh example of the present invention. The interpolation filter of the seventh example has the same configuration as that of the decimation filter of the third example shown in FIG. 8 except that the image data received through an input terminal 700 is applied to a zero insertion section 509. An output terminal is denoted by 799.

In the seventh example, the same effects as those of the third example can be attained for an interpolation filter, instead of a decimation filter. Thus, by using a filter having gentler filtering characteristics in a region where a ringing is more likely to be generated and a filter having steeper filtering characteristics in a region where a ringing is less likely to be generated, it is possible to suppress only the ringing without damaging the definition of a signal.

EXAMPLE 8

Figure 15:
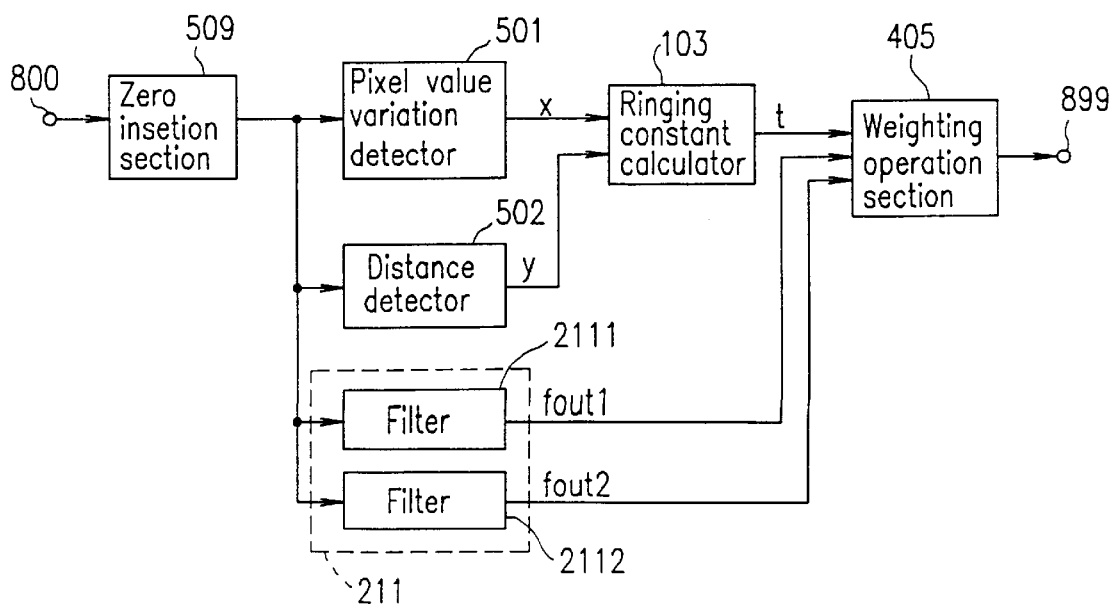
FIG. 15 is a block diagram showing a configuration for an interpolation filter in an eighth example of the present invention.

FIG. 15 is a block diagram showing a configuration for an interpolation filter in an eighth example of the present invention. The interpolation filter of the eighth example has the same configuration as that of the decimation filter of the fourth example shown in FIG. 9 except that the image data received through an input terminal 800 is applied to a zero insertion section 509. An output terminal is denoted by 899.

In the eighth example, the same effects as those of the fourth example can be attained for an interpolation filter, instead of a decimation filter. Thus, by using a filter having gentler filtering characteristics in a region where a ringing is more likely to be generated and a filter having steeper filtering characteristics in a region where a ringing is less likely to be generated, it is possible to suppress only the ringing without damaging the definition of a signal.

According to the present invention, at least the following effects can be attained. Specifically, by using a filter having gentler filtering characteristics in a region where a ringing is more likely to be generated and a filter having steeper filtering characteristics in a region where a ringing is less likely to be generated by the use of a ringing constant t, it is possible to suppress only the ringing without damaging the definition of a signal.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A ringing detector which receives data representing pixel values of a plurality of pixels including: a remarked pixel; a number L (where L is a natural number) of neighboring pixels which are located in the vicinity of the remarked pixel; and a number M (where M is a natural number) of surrounding pixels which are more distant from the remarked pixel than the neighboring pixels are, thereby generating a ringing constant t indicating whether or not a ringing exists in the vicinity of the remarked pixel, the ringing detector comprising:

a pixel value variation detector for calculating a value x corresponding to a variation in the pixel values of the neighboring pixels;

a distance detector for calculating a value y corresponding to a distance between the pixel values of the surrounding pixels and a barycenter of the pixel values of the remarked pixel and the neighboring pixels; and a ringing constant calculator for calculating the ringing constant t based on the values x and y.

2. A ringing detector according to claim 1, further comprising a zero insertion section.

3. A filter comprising a ringing detector which receives data representing pixel values of a plurality of pixels including: a remarked pixel; a number L (where L is a natural number) of neighboring pixels which are located in the vicinity of the remarked pixel; and a number M (where M is a natural number) of surrounding pixels which are more distant from the remarked pixel than the neighboring pixels are, thereby generating a ringing constant t indicating whether or not a ringing exists in the vicinity of the remarked pixel and which comprises: a pixel value variation detector for calculating a value x corresponding to a variation in the pixel values of the neighboring pixels; a distance detector for calculating a value y corresponding to a distance between the pixel values of the surrounding pixels and a barycenter of the pixel values of the remarked pixel and the neighboring pixels; and a ringing constant calculator for calculating the ringing constant t based on the values x and y, and a filtering processing section for subjecting input data to filtering processing having different characteristics in accordance with the ringing constant t.

4. A filter according to claim 3, wherein the filtering processing section comprises a plurality of filters and a filter selector for selecting one from the plurality of filters.

5. A filter according to claim 4, further comprising a zero insertion section.

6. A filter according to claim 3, wherein the filtering processing section comprises a single filter and filtering characteristics of the single filter are varied in accordance with the ringing constant t.

7. A filter according to claim 6, further comprising a zero insertion section.

8. A filter according to claim 3, wherein the filtering processing section comprises a plurality of filters and a weighting operation section for performing a weighting operation with respect to outputs of the plurality of filters and outputting the weighted outputs.

9. A filter according to claim 8, further comprising a zero insertion section.

10. A filter according to claim 3, further comprising a zero insertion section.

* * * * *